US008924246B1

(12) United States Patent
Chen et al.

(10) Patent No.: US 8,924,246 B1
(45) Date of Patent: Dec. 30, 2014

(54) SYSTEMS AND METHODS FOR MOBILE PAYMENTS

(71) Applicant: MShift Inc., Fremont, CA (US)

(72) Inventors: Jeffrey Chen, San Jose, CA (US); Xiaomeng Zhou, Hayward, CA (US); Alan Finke, Pleasanton, CA (US); John Eric Buchbinder, Orinda, CA (US); Scott Moeller, Newark, CA (US); Robert Officer, Fremont, CA (US)

(73) Assignee: MShift Inc., Fremont, CA (US)

( * ) Notice: Subject to any disclaimer, the term of this patent is extended or adjusted under 35 U.S.C. 154(b) by 0 days.

(21) Appl. No.: 13/718,552

(22) Filed: Dec. 18, 2012

Related U.S. Application Data

(60) Provisional application No. 61/578,166, filed on Dec. 20, 2011, provisional application No. 61/656,978, filed on Jun. 7, 2012, provisional application No. 61/664,506, filed on Jun. 26, 2012.

(51) Int. Cl.
   *G06Q 40/00* (2012.01)
   *G06Q 20/34* (2012.01)
(52) U.S. Cl.
   CPC .................................... *G06Q 20/342* (2013.01)
   USPC .................................. 705/14; 705/35; 705/41

(58) Field of Classification Search
   USPC ................................................. 705/14, 35, 41
   See application file for complete search history.

(56) References Cited

U.S. PATENT DOCUMENTS

| | | | |
|---|---|---|---|
| 2009/0099965 A1* | 4/2009 | Grant, IV | 705/41 |
| 2012/0109734 A1* | 5/2012 | Fordyce et al. | 705/14.25 |
| 2012/0123923 A1* | 5/2012 | Nicolaidis et al. | 705/35 |

* cited by examiner

*Primary Examiner* — Harish T Dass
*Assistant Examiner* — Siegfried E Chencinski
(74) *Attorney, Agent, or Firm* — Wilson Sonsini Goodrich & Rosati

(57) ABSTRACT

Systems and methods are provided for mobile payments. A financial institution may offer an electronic prepaid card of a merchant for sale to holders of Demand Deposit Accounts (DDA) and/or Line of Credit Account and/or Loan Account. The card may be provided in electronic form that may be scanned off the account holder's mobile device or by the device. When the account holder purchases the prepaid card, the financial institution may perform a real-time check whether the account holder has sufficient funds. If funds are sufficient, a transfer may be performed from the account holder's account to a holding account of another party at the same financial institution via ON-US transfer. The time duration between prepaid card purchase and its redemption can be so short that the purchaser does not feel the prepay process behind the scene.

24 Claims, 13 Drawing Sheets

Gift Card Purchase

OVERVIEW

AnyWhereMobile consists of five distinct components broken into two major categories: Payment Experience and Funds Settlement. The Payment Experience concerns the procurement and use of Mobile Banking Virtual Gift Cards. Funds Settlement concerns how funds are securely moved from a purchaser, through a financial institution as a third-party distributor, to a merchant account.

PAYMENT EXPERIENCE

1. Mobile Banking Virtual Gift Card

A closed loop gift card, represented by a single-use linear*, 2D, or other digitally formatted bar code, that is sold by a financial institution to Demand Deposit Account (DDA) account holders via mobile banking. The virtual card is displayed on the screen of a mobile device.

\* pictured here

2. Electronic Gifting

Optionally, once a Mobile Banking Virtual Gift Card has been purchased, it may be electronically gifted to an other party. The receiving party's identity, such as first name, last name, email address, and phone number are required.

3. Point of Sale Acceptance

The Mobile Banking Virtual Gift Card can be read / scanned off a mobile device at a point of sale terminal through a standard reader, such as barcode scanner.

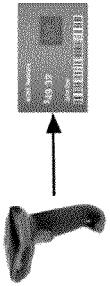

FUNDS SETTLEMENT

4. Holding Account

A holding account is opened at all financial institutions selling Mobile Banking Virtual Gift Cards. At time of purchase, a financial institution does a real time check of the purchaser's DDA account. If the DDA account has sufficient funds, then an "on-us" transfer is performed by the bank from the purchaser's DDA account to the Holding Account for the amount charged for the card.

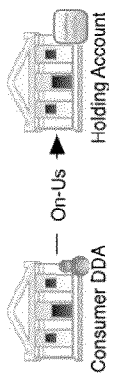

5. Merchant ACH Settlement

A methodology by which funds are transferred from the Holding Account to the Merchant Account. Three configurations are acceptable:

a.) Holding Account ACH to a Settlement Bank ACH to Merchant Account **
b.) Holding Account ACH directly to Merchant Account
c.) Holding Account "On-Us" transfer to Merchant Account

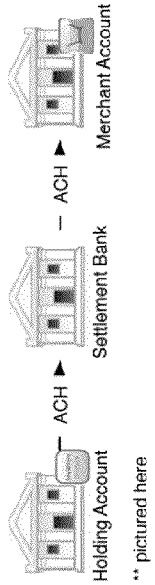

\*\* pictured here

FIG. 1

SYSTEMS AND METHODS FOR MOBILE PAYMENTS

CROSS-REFERENCE

This application claims priority to U.S. Provisional Patent Application Ser. No. 61/578,166, filed on Dec. 20, 2011; U.S. Provisional Patent Application Ser. No. 61/656,978, filed Jun. 7, 2012; and U.S. Provisional Patent Application Ser. No. 61/664,506, filed Jun. 26, 2012, which are entirely incorporated herein by reference.

BACKGROUND OF THE INVENTION

Typically, when a consumer purchases prepaid cards such as gift cards with a credit card, the existing credit card based payment networks (existing payment networks) takes a significant percentage of the prepaid card value. For example, a consumer may purchase a prepaid card with their credit card, and the credit card processor may take several dollars, leaving behind the rest for the merchant and any intermediary. Such costs typically arise due to risk that is born by the existing payment networks, as it is unknown whether the purchaser has sufficient funds to cover the prepaid card. However, such costs reduce the profitability of such prepaid cards.

A need exists for improved systems and methods for prepaid card purchase, payment and redemption systems. A further need exists for systems and methods for utilizing mobile payments.

SUMMARY OF THE INVENTION

The invention provides systems and methods for mobile payments in accordance with aspects of the invention. Various aspects of the invention described herein may be applied to any of the particular applications set forth below or for any other types of financial services applications or prepaid card systems. The invention may be applied as a standalone system or method, or as part of a financial or rewards package. It shall be understood that different aspects of the invention can be appreciated individually, collectively, or in combination with each other.

A financial institution may offer an electronic prepaid card of a merchant for sale to account holders. If the account holder purchases the prepaid card through the financial institution, the account holder may be able to redeem the prepaid card at the merchant. The time to purchase the prepaid card prior to redemption can be shortened to seconds as if the purchase happened in the same time as the redemption (e.g., Instant Prepaid Card). The prepaid card may be provided in electronic form that may be scanned off the account holder's mobile device. When the account holder purchases the prepaid card, the financial institution may perform a real-time check as to whether the account holder has sufficient funds for the purchase. If funds are sufficient, a transfer may be performed from the account holder's account to a holding account of another party. The other party may settle the account with the merchant.

An aspect of the invention is directed to a method for mobile payments comprising: displaying an offer for a prepaid card on a device of an account holder at a financial institution or displaying an offer for a prepaid card at a point of sale to the account holder at a financial institution; accepting a command to purchase the prepaid card from the account holder; determining, with aid of a processor, whether the account holder has sufficient funds or line of credit in the account holder's account at the financial institution; and initiating a transfer for the cost of the purchased prepaid card from the account holder's account to a holding account at the same financial institution if the account holder has sufficient funds or line of credit. The method may further comprise: recording the value of the purchased card into a database; generating and presenting the specific prepaid card for redemption by the user at the point of sale; reading and redeeming the value displayed by the prepaid card at the point of sale; and updating the database to reflect the change in the underlying value held on the card upon transactions.

Additional aspects and advantages of the present disclosure will become more readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 shows an example of a method for mobile payments, provided in accordance with an embodiment of the invention.

DETAILED DESCRIPTION OF THE INVENTION

Figure 2:
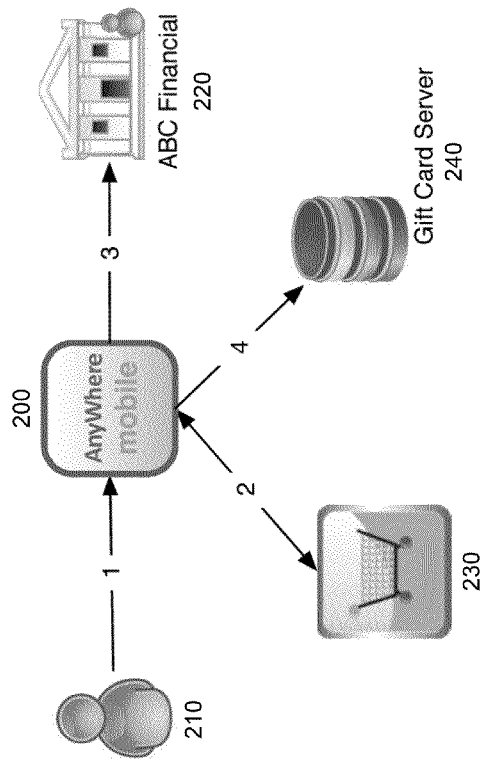
FIG. 2 shows an example of data flow in accordance with an embodiment of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for mobile payments in accordance with aspects of the invention. Various aspects of the invention described herein may be applied to any of the particular applications set forth below or for any other types of financial services applications or prepaid card systems, including Instant Prepaid Card System. The invention may be applied as a standalone system or method, or as part of a financial or rewards package. It shall be understood that different aspects of the invention can be appreciated individually, collectively, or in combination with each other.

FIG. 1 shows an example of a method for mobile payments, provided in accordance with an embodiment of the invention. A payment experience and funds settlement may be described as outlined therein.

In a payment experience, a first step may include the offer of a prepaid card for sale to an account holder of a financial institution. The financial institution may be a bank. A financial institution may be a deposit-taking institution, such as a bank, building society, credit union, trust company, or mortgage loan company. Alternatively, a financial institution may be an insurance company, pension fund, broker, underwriter, or investment fund. Any description herein of a bank may apply to any other type of financial institution, and vice versa. An account holder may be interacting with the account holder's bank account.

In some instances, the account holder may be viewing the account holder's bank account information online through a user device. The user device may be a computer, laptop, or mobile device (e.g., tablet, smartphone, cell phone, personal digital assistant) or any other type of device. The device may be a networked device. The device may have a memory, processor, and/or display. The memory may be capable of storing persistent and/or transient data. Those persistent and/or transient data may be stored in the cloud. Non-transitory computer readable media containing code, logic, or instructions for one or more steps described herein may be stored in memory. The processor may be capable of carrying out one or more steps described herein. A display may show data and/or permit user interaction. For example, the display may include a screen, such as a touchscreen, through which the user may be able to view data, such as data pertaining to the user's financial account. The display may be capable of displaying images, such as an image of a prepaid card, barcode, or any optically identifying information. The device may be capable of transmitting signals to other devices by electronic channels such as Near Field Communications (NFC).

The device may be capable of wired or wireless communications with the financial institution. The financial institution may have one or more server and/or database which may store account holder information. The user device may communicate with the financial institution via a network, such as the Internet, a local area network, or telecommunications network (e.g., cellular phone network or data network). Communication may also be intermediated by a third party.

In one example, the account holder may be interacting with the financial institution via a mobile banking application or website. For example, the account holder may be using the account holder's smartphone or other mobile device to access the account holder's information.

A prepaid card such as a gift card may be offered for sale to an account holder. The prepaid card may be a virtual mobile or electronic prepaid card offered to the user while the user is accessing the user's account information via a mobile device. The prepaid card may be an electronic prepaid card. The prepaid card may include a visually identifying feature that may permit the electronic prepaid card to be scanned, read, or entered manually at a physical point of sale. The time to purchase the prepaid card prior to redemption can be shortened to seconds as if the purchase happened in the same time as the redemption (e.g., Instant Prepaid Card) at a physical point of sale. The time duration between prepaid card purchase and its redemption can be so short that the purchaser does not feel the prepay process behind the scene. This Instant Prepaid Card may be referred to as an AnyWhereMobile Debit Card.

In some instances, the prepaid card may be redeemable at one or more merchant. The prepaid card may be redeemable at a single specific retailer, or a group/consortium of retailers. The merchant may have a physical location at which the prepaid card may be redeemed. Alternatively, the merchant may have a virtual location (e.g., online location) at which the prepaid card may be redeemed. The Instant Prepaid Card which is referred as AnyWhereMobile Debit Card is redeemable at multiple merchants.

The prepaid card may be offered for sale to the account holder while the account holder is accessing his or her financial institution account. The user may be logged into his or her bank account. For example, the user may be accessing information on his or her checking or savings account. The user may decide whether to purchase the prepaid card while the user is accessing his or her account information. Such sales offers may or may not be targeted based on knowledge collected about the account holder's financial habits. For example, the financial institution may note that the account holder has made a large number of purchases from electronics stores. An offer for a prepaid card at an electronics store may be made. In some instances, the offer for sale may be made while the account holder is not logged into his or her account. For example, the offer may be sent to the account holder via an email, text message, or other electronic notification. The user may have to provide electronic credentials in order to make the purchase.

The user may purchase the prepaid card for him or herself, or for another. In one example, once a mobile prepaid card has been purchased, it may be electronically gifted to another party. Identifying information about the recipient of the gift may be provided by the user and retained. For example, the recipient's name, email address, phone number, or other information may be provided by the purchaser. In some instances, the user may purchase the prepaid card and gift it to him or herself as the recipient. Once purchased or gifted, the prepaid card may be reloaded with additional value and is said to be reloadable.

The recipient may receive the prepaid card electronically. For example, the prepaid card may appear to the recipient in an email, or on a web site that the recipient may access. In some instances, the prepaid card may be viewable from a mobile device. The prepaid card may appear on a display of a consumer's device. The consumer may be a recipient of the card. In some instances, the prepaid card may be redeemed at a point of sale through presentation on the mobile device. For example, a physical retailer site (e.g., store), may be able to scan the virtual prepaid card through a standard reader, such as a barcode scanner. The prepaid card may have a barcode or other visually identifying feature that may be shown on a display of the mobile device. In other embodiments, the presentation of the prepaid card data may be communicated by the application via an electronic channel to an electronic reader such as a Near Field Communications (NFC) device at the Point of Sale. In other embodiments, the prepaid card may be printed by the recipient, and may be scanned from the hard copy. In other embodiments, the prepaid card may include information that may permit the prepaid card to be redeemed at a physical or virtual location. For example, an alphanumeric string may be provided on the prepaid card that may be entered at a web site or a point of sale to redeem the prepaid card.

From a funds settlement perspective, financial transactions may occur on the back end. A holding account may be opened at a financial institution that offers the prepaid cards for sale. The offer may be provided via an Intermediary who may interact with the bank and the merchants. For example, if an account holder at Bank1 receives an offer for a prepaid card, the Intermediary may also have an account at Bank1. The Intermediary account at Bank1 may be the holding account.

If the account holder at Bank1 purchases the prepaid card, Bank1 may do a real time check on the purchaser's bank account. For example Bank1 may check the purchaser's Demand Deposit Account (DDA). If the DDA has sufficient funds (e.g., if a $100 prepaid card was purchased, the purchaser has sufficient funds for the $100), then an "on-us" transfer may be performed by Bank1 from the purchaser's DDA account to the holding account of the Intermediary at Bank1. Because both accounts are Bank1 accounts, the transfer is an "on-us" transfer. The amount of the transfer may equal the amount charged the purchaser for the card. Thus, when a prepaid card is purchased by an account holder at a bank, the cost of the card may be transferred from the account holder's bank account at that bank to a holding account at the same bank. The holding account may belong to an intermediary or other party.

Figure 4:
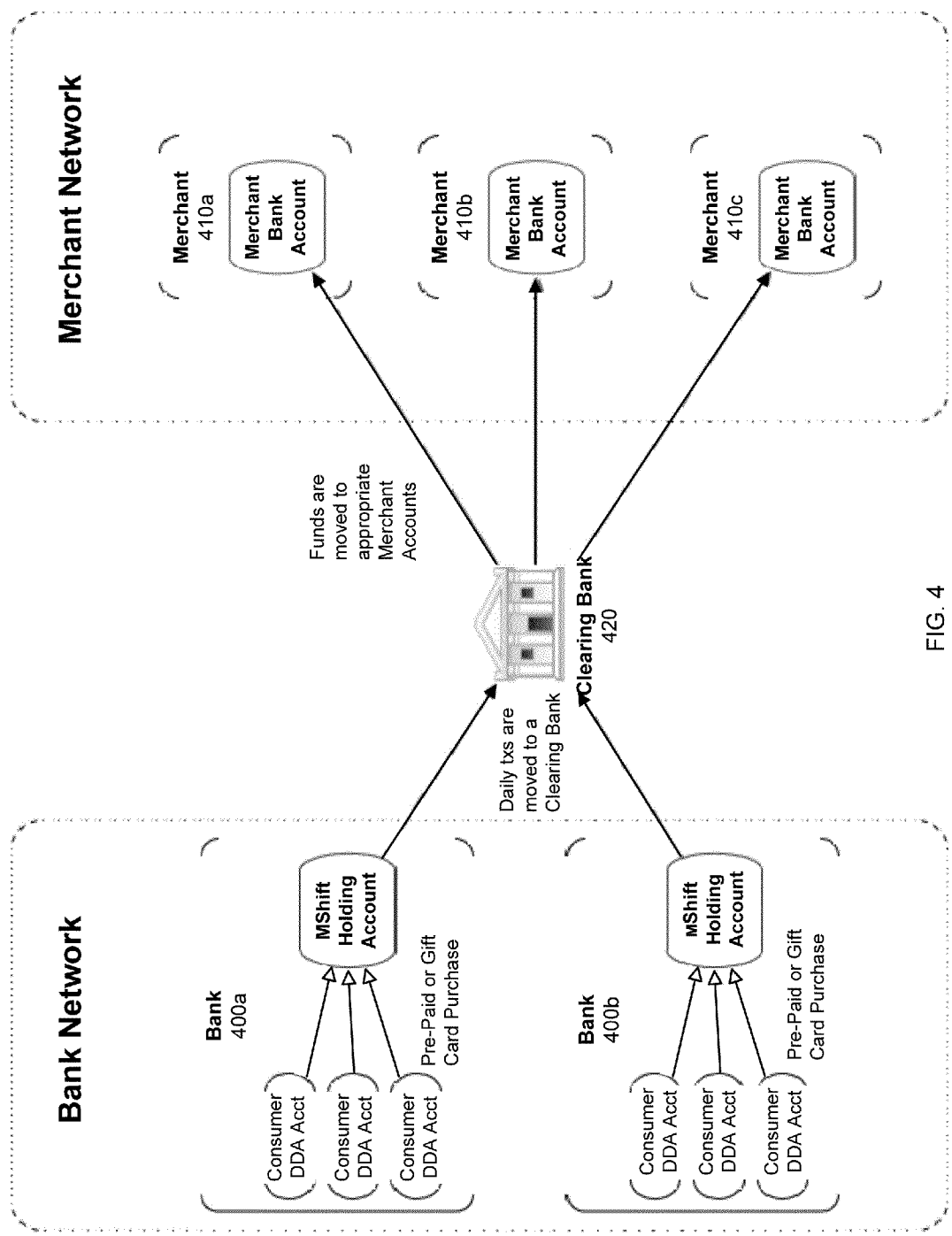
FIG. 4 shows another example of financial in accordance with an embodiment of the invention.

Funds may be transferred from the holding account to a merchant account. The merchant may be the entity from whom the prepaid card may be redeemed/used. The merchant account may or may not be at the same bank as the holding account. Some examples of possible transfer paths may include (1) holding account automated clearing house (ACH) to a settlement bank ACH to the merchant account; (2) holding account ACH directly to merchant account; or (3) holding account "on-us" transfer to merchant account. In some instances, option (3) may be used when the holding account and merchant account are at the same bank. In some instances, any number of intermediary accounts may be provided during the transfer. The path chosen for the transfer(s) may be automatically chosen to minimize transaction costs. For example, a plurality of settlement bank transfers may occur between the holdings account and the merchant account. FIG. 4 illustrates a possible settlement path between a plurality of financial institutions 400a, 400b and a plurality of merchants 410a, 410b, 410c. Any description herein of fund transfers may apply to any number of financial institutions with one or more consumer accounts and any number of merchants with one or more merchant accounts, optionally via a clearing bank 420.

In some instances, the holding account may belong to an Intermediary. In some instances, the Intermediary is neither the bank/financial institution nor the merchant. The Intermediary may receive a portion of the cost of the prepaid card (e.g., if a $100 prepaid card is purchased by the account holder, the Intermediary may receive $1, and the merchant may receive $99). In another example, a bank that offers the prepaid card to its account holders may or may not receive a portion of the cost of the prepaid card. (e.g., if a $100 prepaid card is purchased by the account holder, the bank may receive $1, the Intermediary may receive $1, and the merchant may receive $98).

In some embodiments, the Intermediary is not an existing payment network. In some instances, the transactions may occur without the intervention of an existing payment network or use of a credit or debit card. The purchase may occur by transferring money directly from the prepaid card purchaser's bank account without using a credit or debit card of the purchaser. The transactions may occur without incurring fees from an existing payment network.

FIG. 2 shows an example of data flow in accordance with an embodiment of the invention. An intermediary application 200 (e.g., AnyWhereMobile) may be provided. A customer 210, financial institution 220, financial institution shop 230, and/or prepaid card server 240 may interact with the intermediary application.

In some instances, the intermediary application may be a plug-in or mobile application. The intermediary application may include software, which may include computer readable media. The intermediary application may be downloaded by the customer. For example, the intermediary application may be downloaded to a device, such as a mobile device. The intermediary application may be incorporated into a mobile banking application, provided as a stand-alone application, or incorporated into other applications. The customer may choose to use the intermediary application. Alternatively, the intermediary application may be provided to all users of the mobile banking application.

A customer may be an account holder at a bank, such as ABC Financial. The customer may launch a mobile banking application. For example, the customer may be on a mobile device, and may launch the application from the mobile device to access the customer's ABC Financial account information. In some instances, the customer may be on a computer and may launch a mobile banking application from the computer to access his or her account information. The mobile banking application may have a plug-in. The plug-in may be the intermediary application.

The customer may shop and/or receive information from a merchant network. The customer may be logged into the customer's account while shopping and/or receiving offers. The customer may be viewing the customer's financial account information, or may be browsing a dedicated shop section.

The customer may purchase a prepaid card. The customer may purchase the prepaid card while using the mobile banking application and/or while logged into his or her account. Payment authorization may be sent to the financial institution (e.g., ABC Financial).

The intermediary application may update a prepaid card server. The prepaid card server may belong to a merchant. The merchant's prepaid card server may track what prepaid cards have been sold. Information such as prepaid card amount, recipient of prepaid card, purchase of the prepaid card may or may not be included. The prepaid card server may also manage reward and loyalty programs on behalf of the merchant or financial institution.

Figure 3:
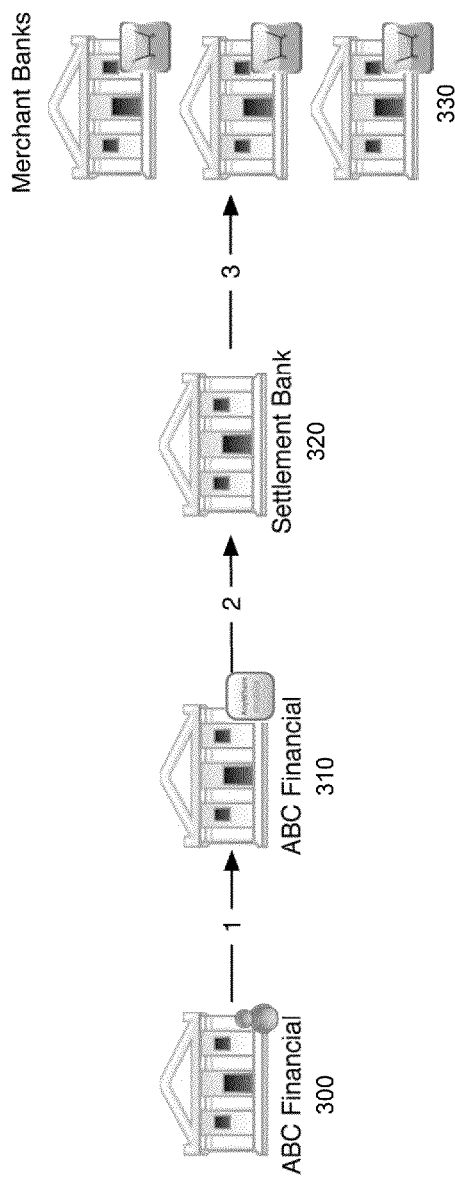
FIG. 3 shows an example of financial flow in accordance with an embodiment of the invention.

FIG. 3 shows an example of financial flow in accordance with an embodiment of the invention. A financial institution (e.g., ABC Financial) may provide one or more accounts. A customer of a prepaid card may have an account at ABC Financial. A transfer may be initiated from the customer's bank 300 (e.g., ABC Financial) Demand Deposit Account (DDA) to a holding account at the same bank 310 (e.g., ABC Financial). In some instances, the customer's bank may check that the customer has sufficient funds in the customer's bank account to make the purchase. If the customer does have sufficient funds, the purchase may be approved and the transfer may be initiated. If the customer does not have sufficient funds, the purchase may be denied, and no transfer may occur. This may reduce the risk associated with the purchase of the prepaid card. The transfer between the two accounts within the same bank may be an "On-Us" transfer. In some instances, the "On-Us" transfer may occur without incurring fees from the bank. The transfer may be instantaneous, or some lag time may be provided.

The transfer may be initiated by the intermediary application (e.g., AnyWhereMobile). The intermediary application may be provided by an intermediary entity (e.g., not the financial institution, not the merchant). Alternatively, the intermediary application may be provided by one of the other participating entities (e.g., financial institution, merchant). The intermediary application may be provided by an entity which is not an existing card based payment network. The holding account may belong to an intermediary entity. The intermediary entity to which the holding account belongs may or may not be the same intermediary entity that provides the intermediary application.

A settlement process may be provided between the holding account and the merchant account. In one example, a settlement process may be initiated with an ACH to a central settlement bank 320. The settlement process may be initiated by the intermediary application (e.g., AnyWhereMobile). A settlement process may be completed between the settlement bank and the merchant's DDA account.

In some embodiments, multiple merchants may participate in the process. For example, an account holder at a financial institution may receive offers for prepaid cards from multiple merchants, or may have the option of viewing a prepaid card selected from a plurality of possible merchants. The account holder may select to purchase prepaid cards from one or a plurality of merchants. Depending on which prepaid card the account holder purchases, the settlement may be made with the corresponding merchant.

A holding account and/or settlement bank account may be capable of transferring funds to a plurality of merchants. The plurality of merchants may have accounts at one or more financial institutions 330. For example, if Merchant 1, Merchant 2, and Merchant 3 participate, and prepaid cards are purchased by one or various DDA account holders of the financial institution, the holding account may be capable of settling accounts with Merchants 1, 2, and 3. The transfer may occur to directly from the holding accounts to the various merchants, or from the holding account to the settlement bank account, which may transfer funds to the various merchants.

Such settlements and/or transfers of funds may occur without the intervention or use of credit or debit cards and accounts. An existing payment network reliant upon credit or debit cards is not involved as a party in these transactions.

In some embodiments, a plurality of financial institutions may participate. Each of the financial institutions of said plurality may be capable of providing prepaid card offers from the same pool of merchants, or may be selective and provide prepaid card offers from selected merchants, which may be a subset of the entire pool of merchants. For example ABC Financial may provide offers from Merchants 1, 2, and 3, while XYZ Financial may provide offers from Merchants 1, 3, and 4.

Each of the financial institutions may have their own mobile banking applications and environments. For example, ABC Financial may have a mobile banking application and/or interface that may provide a different user experience or different features from XYZ Financial. An intermediary application (e.g., AnyWhereMobile plug-in) may be provided for each of the financial institutions. In some instances, the intermediary application may provide the same features to each of the financial institutions, which may have their own mobile banking interfaces. Each participating financial institution may have the same or different formats for the offer of prepaid cards for sale.

An intermediary entity may have a holding account at each participating financial institution. For example, an intermediary may have a holding account at ABC Financial and a holding account at XYZ Financial. If an account holder from ABC Financial makes a prepaid card purchase, the funds may be transferred from the account holder's ABC Financial account to the intermediary's ABC Financial holding account. If an account holder from XYZ Financial makes a prepaid card purchase, the funds may be transferred from the account holder's XYZ Financial account to the intermediary's XYZ Financial holding account. Funds may be transferred from the ABC Financial holding account and/or the XYZ holding account directly to the appropriate merchant, or to a settlement bank account. In some instances, they may be transferred to the same settlement bank account. The settlement bank account may serve as a hub or centralized account which may receive funds from a plurality of holding accounts from various participating financial institutions. The settlement bank account may send funds to the appropriate merchants.

Any steps described herein may be performed with aid of a processor. For example, transfer of funds may occur in an automated manner with aid of a processor. One or more steps or transfers may occur rapidly. For example, fewer than several hours, minutes, seconds, or milliseconds may be used to perform one or more step or transfer.

Figure 5:
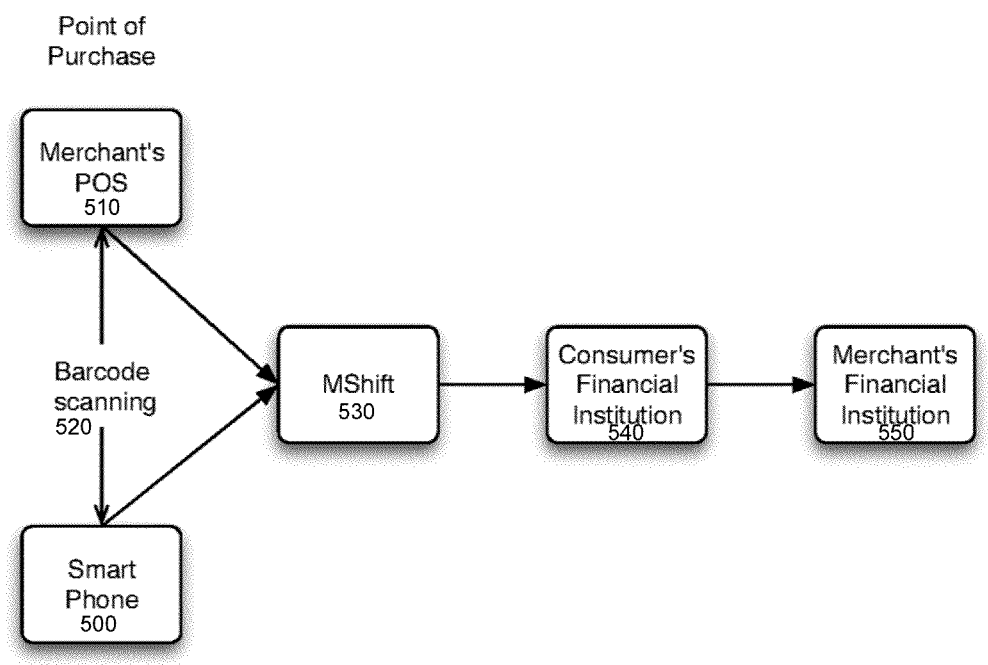
FIG. 5 shows a mobile card connections overview in accordance with an embodiment of the invention.

Any number of customers from a participating financial institution may be offered a prepaid card or may make a purchase of prepaid cards. Any number of customers over any number of participating financial institutions may be offered a prepaid card or may purchase prepaid cards. A customer may be offered a single prepaid card or a plurality of prepaid cards, or may purchase a single prepaid card or a plurality of prepaid cards, for a single merchant or a plurality of merchants. FIG. 5 shows a mobile card connections overview in accordance with an embodiment of the invention. In some embodiments, a pre-paid card may be an "instant" prepaid card. The time to purchase the prepaid card prior to redemption can be shortened to seconds as if the purchase happened in the same time as the redemption (e.g., Instant Prepaid Card) at a physical point of sale. The time duration between prepaid card purchase and its redemption can be so short that the purchaser does not feel the prepay process behind the scene. As well as being redeemed for goods or services, in some embodiments, the Instant Prepaid Card may be redeemed for cash so that the merchant operates in the role of an ATM. This Instant Prepaid Card may be referred to as an AnyWhereMobile Debit Card if Demand Deposit Accounts are used as founding source. As a result, in some embodiments, the instant prepaid card may function as a debit card or a credit card. In one example, an instant prepaid debit card may have one or more DDA accounts as funding sources. A prepaid debit card may directly debit funds from checking and savings accounts to complete the transaction rapidly. In some instances, the transaction may be completely almost instantaneously, in several seconds or fewer. An instant prepaid card may use accounts of line of credit or loans instead of DDA accounts. When an instant prepaid card use accounts of line of credit or loans as founding source, the instant prepaid card may be referred as an AnyWhereMobile Credit Card.

A consumer may have a mobile device, such as any mobile described herein including but not limited to a smartphone 500 (e.g., iPhone, Blackberry, Android-enable device), tablet, personal digital assistant, cellular phone, or laptop. The consumer may be at a point of sale location, such as a merchant point of purchase 510. The merchant site may have one or more mobile cards, such as prepaid debit or credit cards. The consumer may pick up a physical card or may receive an electronic representation of the card on their mobile device. The consumer may or may not be at the merchant site when purchasing or using the prepaid card. The prepaid card may be purchased from the merchant. The prepaid card may be reloaded through the merchant, or may be used to purchase other items from the merchant. The consumer may interact with the merchant remotely when purchasing or using the prepaid card. A device may be provided at a merchant site, which may include any of the devices described elsewhere herein. The consumer mobile device and/or the merchant device may communicate with one another and/or with an intermediary (e.g., MShift). The merchant's device may be tied to or communicating with a merchant register. The intermediary may communicate with the consumer's financial institution and/or the merchant's financial institution. In some embodiments, the intermediary may communicate with the consumer's financial institution which may communicate with the merchant's financial institution and vice versa. Communications may occur over a network. In some instances communications may be wireless.

An identifier, such as a barcode may be presented. The barcode may be a 1D, 2D, 3D barcode. In other examples, alphanumeric strings, images, quick response (QR) codes may be provided as identifiers. Any other unique identifier may be utilized. The identifier may be capable of being optically scanned (e.g., barcode scanned by barcode scanner 520, image captured by camera or other image capturing device). In other embodiments, the identifier may emit one or more detectable signal that may permit unique identification by a detector. The identifier may identify the card and/or transaction.

The identifier may be provided at a point of sale. For instance, a barcode may be provided at a merchant and/or by a merchant device. In other examples, the barcode may be presented by a mobile device, such as a smartphone. The barcode may be presented on a consumer device.

Information may be provided to an intermediary 530. Interactions with the consumer's financial institution 540 and/or a merchant's financial institution 550 may occur. Examples are provided further herein.

Figure 6:
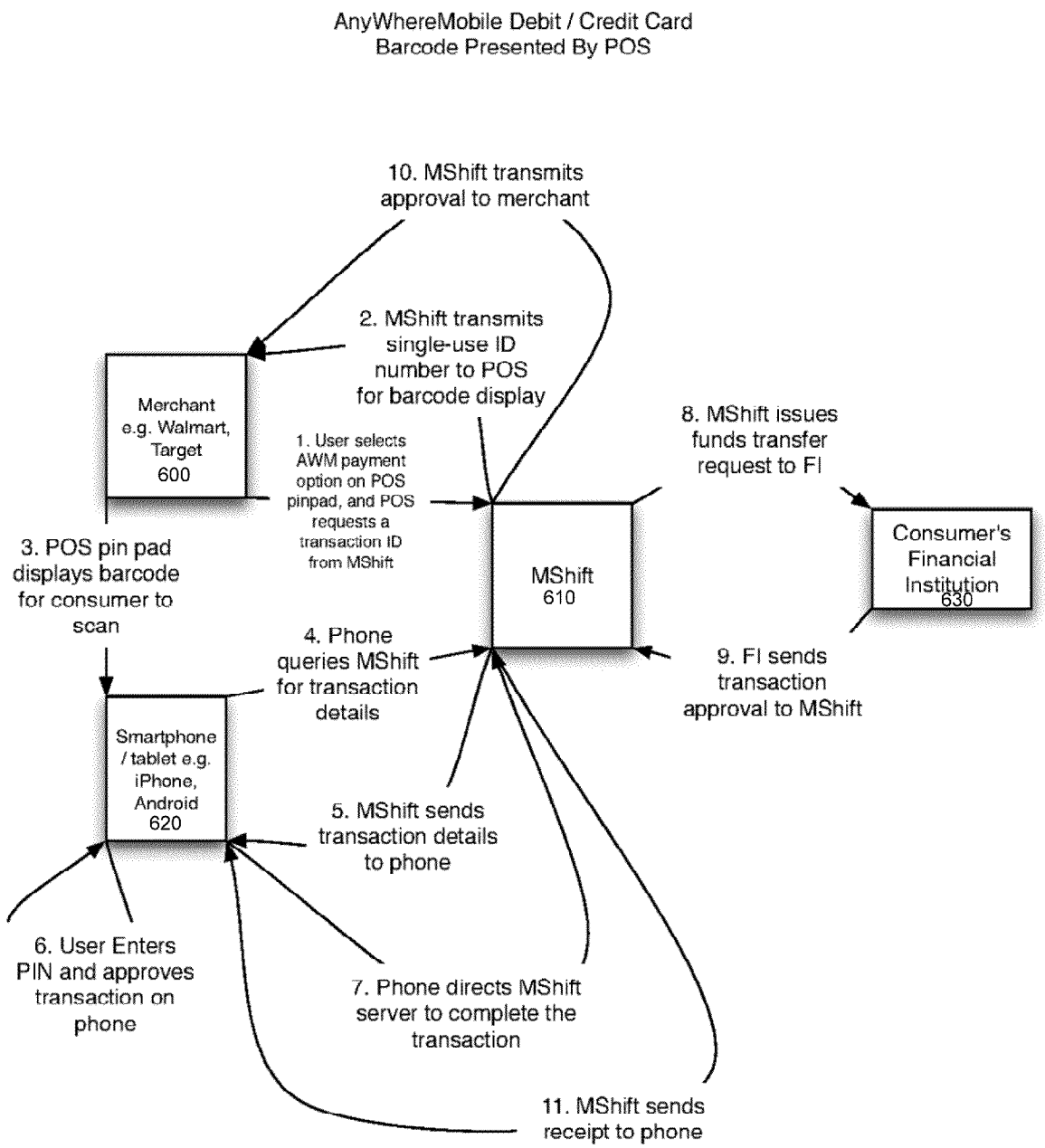
FIG. 6 provides a flow diagram for a scenario where an identifier is provided at a point of sale.

FIG. 6 provides a flow diagram for a scenario where an identifier is provided at a point of sale. The point of sale may be a merchant 600, such as Walmart or Target. A user may select an AnyWhereMobile (AWM) payment option on a point of sale pin pad or other device with a user interface and the point of sale may request a transaction identifier from an intermediary source 610. The user may be a consumer seeking to purchase a prepaid card from the point of sale.

The intermediary source may transmit a single-use identifier (e.g., code, number, string, barcode, or any other examples described herein) to the point of sale for display. The identifier may be displayed as a barcode. The point of sale pin pad or other device may display the barcode for the consumer to scan. In some embodiments, the consumer may use the consumer's mobile device 620 to scan the identifier. The identifier may be sent to the consumer's mobile device. In some instances, the consumer may use the consumer's mobile device to capture an image of the identifier.

The consumer's mobile device may query the intermediary for transaction details. In response, the intermediary may send the transaction details to the mobile device. The user may review the transaction details on the mobile device. The user may view the transaction details via a user interface on the mobile device (e.g., video display, screen, touchscreen, audio). The user may provide an input to approve the transaction. The input may be provided via the user's mobile device. For example, the user may enter a PIN number or other form of authentication to approve the transaction on the user's mobile device. When approved, the mobile device may send instructions to the intermediary server to complete the transaction.

Once the intermediary server has received instructions to proceed with the transaction, the intermediary may issue a funds transfer request to a financial institution 630. The financial institution may be the consumer's financial institution (e.g., the financial institution where the consumer has one or more account, such as a checking or savings account). The financial institution may consider the request and whether to grant approval. Approval may be granted automatically or based on one or more conditions (e.g., consumer has enough funds). The financial institution may send transaction to the intermediary. Transaction approval may be sent to the intermediary from the financial institution.

The intermediary may transmit approval to the merchant, after receiving approval from the financial institution. After the merchant receives approval the transaction may be completed. For example, the user may receive the prepaid card that the user will be capable of using right away. The intermediary may also send a receipt to the consumer. The receipt may be sent to the user's mobile device and/or accessible via the user's mobile device, or via any other forms of communication.

Figure 7:
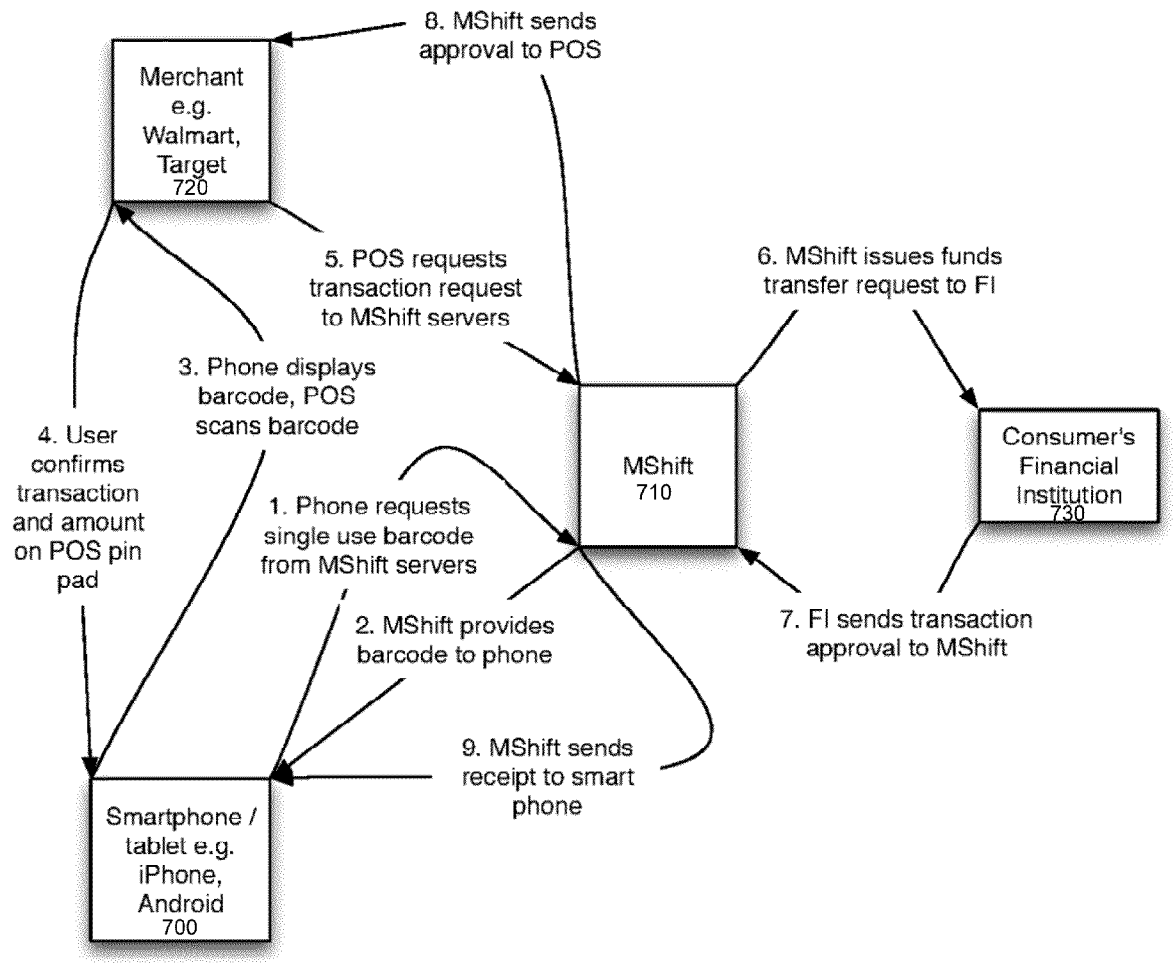
FIG. 7 provides a flow diagram for a scenario where an identifier is provided by a mobile device.

FIG. 7 provides a flow diagram for a scenario where an identifier is provided by a mobile device 700. The mobile device may be a smartphone (e.g., iPhone, Blackberry, Android-enable device), tablet, or other portable electronic device. The mobile device may belong to a consumer who is seeking to purchase a prepaid card from a point of sale. The user may select a card for purchase and/or use the card. The mobile device may request a single user identifier (e.g., barcode) from intermediary servers.

The intermediary source 710 may transmit a single-use identifier (e.g., code, number, string, barcode, or any other examples described herein) to the mobile device. The identifier may be displayed as a barcode. The identifier may be displayed on a user interface of the mobile device. In some instances, the identifier may be visible and/or optically detectable.

The point of sale 720 may scan the identifier from the consumer's mobile device. The identifier may be sent to a device of the point of sale. In some instances, a barcode scanner or other image capturing device may be used by the point of sale to read the identifier.

The user may review the transaction details and/or amount. In some embodiments, the user may be a consumer confirming the transaction on the consumer's mobile device. In another example, the user may view and/or confirm the transaction via a point of sale device. The user may view the transaction details via a user interface on the mobile device or merchant device (e.g., video display, screen, touchscreen, audio). The user may provide an input to approve the transaction. The input may be provided via the point of sale device and/or the user's mobile device. For example, the user may enter a PIN number to approve the transaction (and/or amount of transaction) on a pin pad of the point of sale. When approved, the point of sale device may send instructions to the intermediary server to complete the transaction.

Once the intermediary server has received instructions to proceed with the transaction, the intermediary may issue a funds transfer request to a financial institution 730. The financial institution may be the consumer's financial institution (e.g., the financial institution where the consumer has one or more account, such as a checking or savings account). The financial institution may consider the request and whether to grant approval. Approval may be granted automatically or based on one or more conditions (e.g., consumer has enough funds). The financial institution may send transaction to the intermediary. Transaction approval may be provided to the intermediary from the financial institution.

The intermediary may transmit approval to the point of sale, after receiving approval from the financial institution. After the merchant receives approval the transaction may be completed. For example, the user may receive the prepaid card that the user will be capable of using right away. The intermediary may also send a receipt to the consumer. The receipt may be sent to the user's mobile device and/or accessible via the user's mobile device, or via any other forms of communication.

Figure 8:
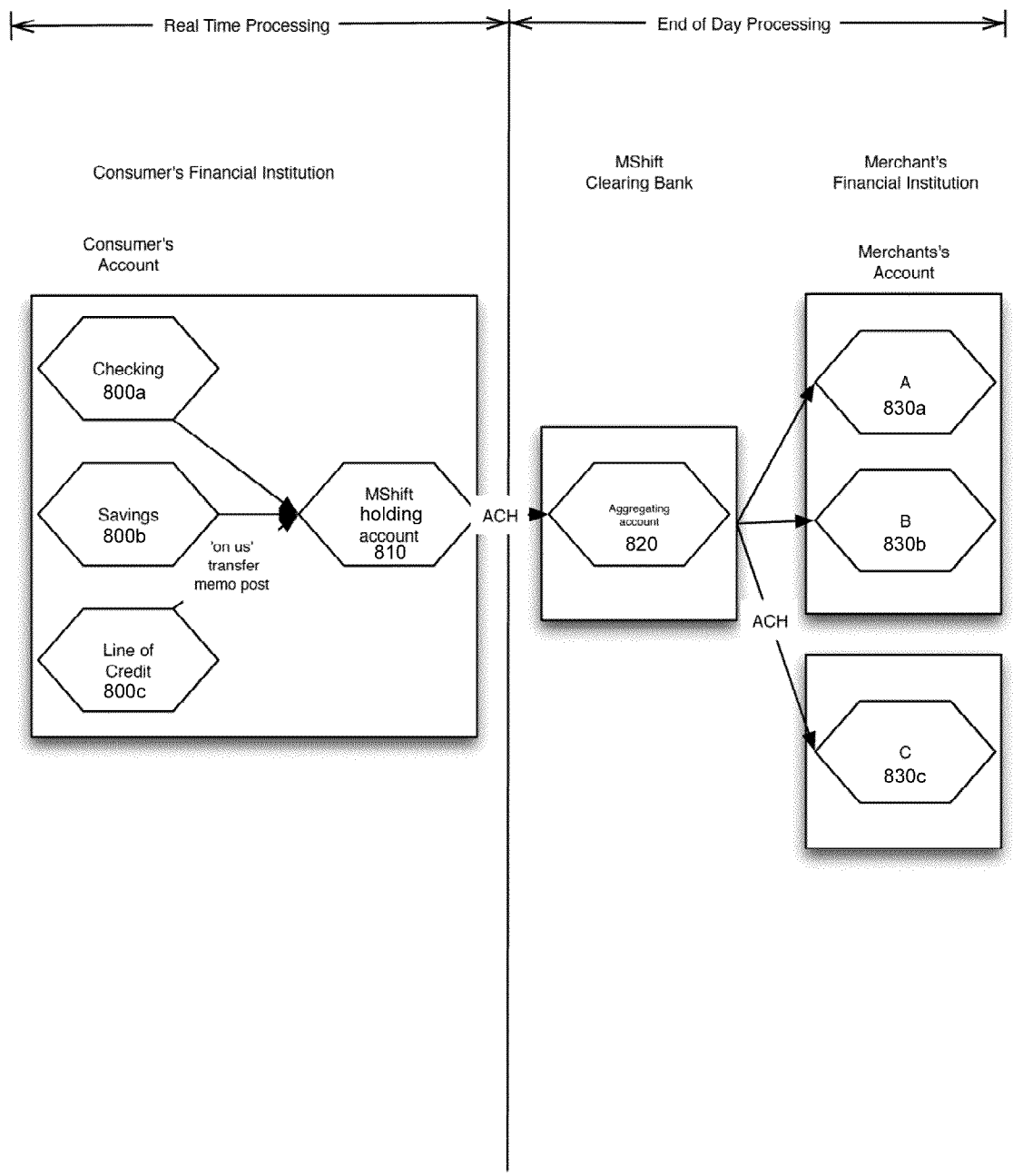
FIG. 8 provides an example of a back end/end of day flow.

FIG. 8 provides an example of a back end/end of day flow. In some embodiments, one or more steps or processes described herein may occur in real-time. One or more steps or processes may occur at the end of the day or at other periodic intervals (e.g., hourly, every several hours, daily, every several days, weekly, monthly).

Funds transfers for the payment platform may take place in multiple phases. The first phase may be the real time securing of funds and transfer of funds to an intermediary controlled holding account at a cardholder's financial institution. This may be a combination of a memo post and an 'on us' transfer within the financial institution's core banking software.

The second phase may occur as multiple (e.g., two) steps during the end of day processing. The first step may take place at the cardholder's financial institution. This can be a transfer of funds from the intermediary holding account to the intermediary clearing account in a settlement bank. This transfer may take place as an automated clearing house (ACH) transaction. There may be a single ACH for transaction sent to the intermediary clearing account from each participating financial institution. The second step of the end of day process may be an ACH from the intermediary cleaning account to each merchant account. Tools and reports can be provided to the merchants for reconciling funds that have been transferred.

FIG. 8 shows an example of the multiphase process. In some embodiments, one or more transactions with the consumer's financial institution may occur in real-time. A consumer may have one or more account at the consumer's financial institution. Examples of consumer's accounts may include but are not limited to a checking account 800*a*, savings account 800*b*, or line of credit 800*c*. In some instances, examples of accounts may include demand deposit account, line of credit account, and/or loan account. An intermediary may have an account with the consumer's financial institution. For example, the intermediary may have a holding account 810 at the same institution as the consumer's account. Funds may be transferred from a consumer account to the intermediary account at the same financial institution. In some instances, no fees are incurred from the financial institution if the funds are transferred from the consumer account to the intermediary account. The transfer may be an 'on us' transfer. Funds may be transferred from the consumer's checking account, savings account, and/or line of credit to the intermediary account. Such funds may be transferred in real-time when the consumer is purchasing a prepaid card.

An automated clearing house (ACH) process may be used between the intermediary holding account and an aggregating (clearing) account 820 in a settlement bank. The aggregating (clearing) account may belong to the intermediary and may be provided at the intermediary's clearing (settlement) bank. The aggregating (clearing) account may receive funds from all participating financial institutions. For instance, various users may interact with the systems, which may have accounts at various financial institutions, that also have intermediary holding accounts. Each of the financial institutions that have intermediary holding accounts may provide funds (e.g., via ACH) if any have been transferred during end of day processing, from the various holding accounts to the intermediary clearing account to aggregate funds.

The aggregating (clearing) account may be capable of interacting with one or more merchant accounts 830*a*, 830*b*, 830*c*. The merchant accounts may be provided at a merchant's financial institution. In some embodiments, the merchants may have one or a plurality of accounts distributed over one or more a plurality of merchant financial institutions. In some instances, an ACH process may be used between the aggregating (clearing) account and the merchant financial institutions. In some instances, end of the day processing (or other periodic interval processing) may be provided for the transactions between the aggregating account(s) and the merchant account(s).

Many individual transactions may flow into aggregation accounts. These accounts may be set up in a way so that transactions can be ACH transaction: (1) sending fund from each financial institution specific intermediary account to the intermediate clearing account via ACH, (2) receiving fund for the transfer from step (1) via ACH, and/or (3) sending fund to each merchant bank account via ACH—this may help keep the cost low as the volume of transactions can be scaled up.

In some embodiments, the funds that may be transferred for the purchase or use (e.g., reloading the card, making a purchase with the card) of a prepaid card from a merchant. For example, a consumer may purchase or use a prepaid card using funds from one of the consumer's accounts. The funds used to prepay for the card or to use the card may be sent to the intermediary's holding account. The funds may then be transferred to the intermediary's aggregating (clearing) account in settlement or clearing bank, which may in turn transfer funds to the merchant's accounts.

Figure 13:
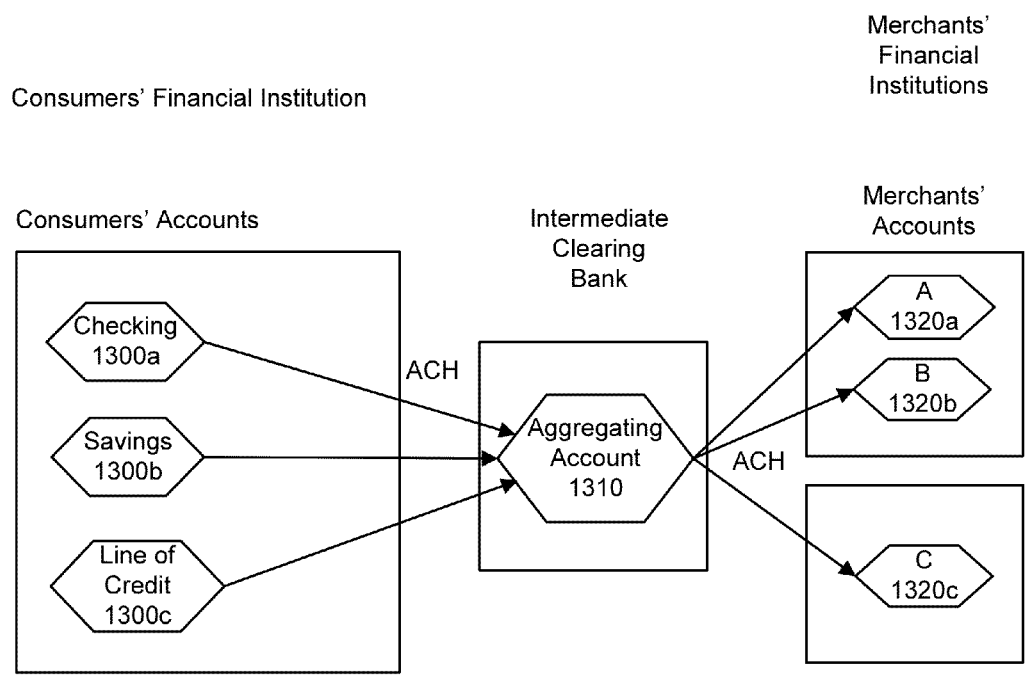
FIG. 13 shows an example of a flow where funds may be transferred from an account holder's account to an aggregated account at a different financial institution.

In some embodiments, it may not be practicable to establish a holding account at the account holder's financial institution. In that case, funds may be transferred by ACH directly from the account holder's account(s) 1300*a*, 1300*b*, 1300*c* to an aggregating (clearing) account 1310 at a different financial institution. FIG. 13 shows an example of such a flow. To insure the funds are properly reserved, a hold may be placed on the funds in the account holder's account until the ACH transaction has completed. The aggregating account may be capable of interacting with one or more merchant accounts 1320*a*, 1320*b*, 1320*c*. Such interactions may occur as described elsewhere herein.

Figure 9:
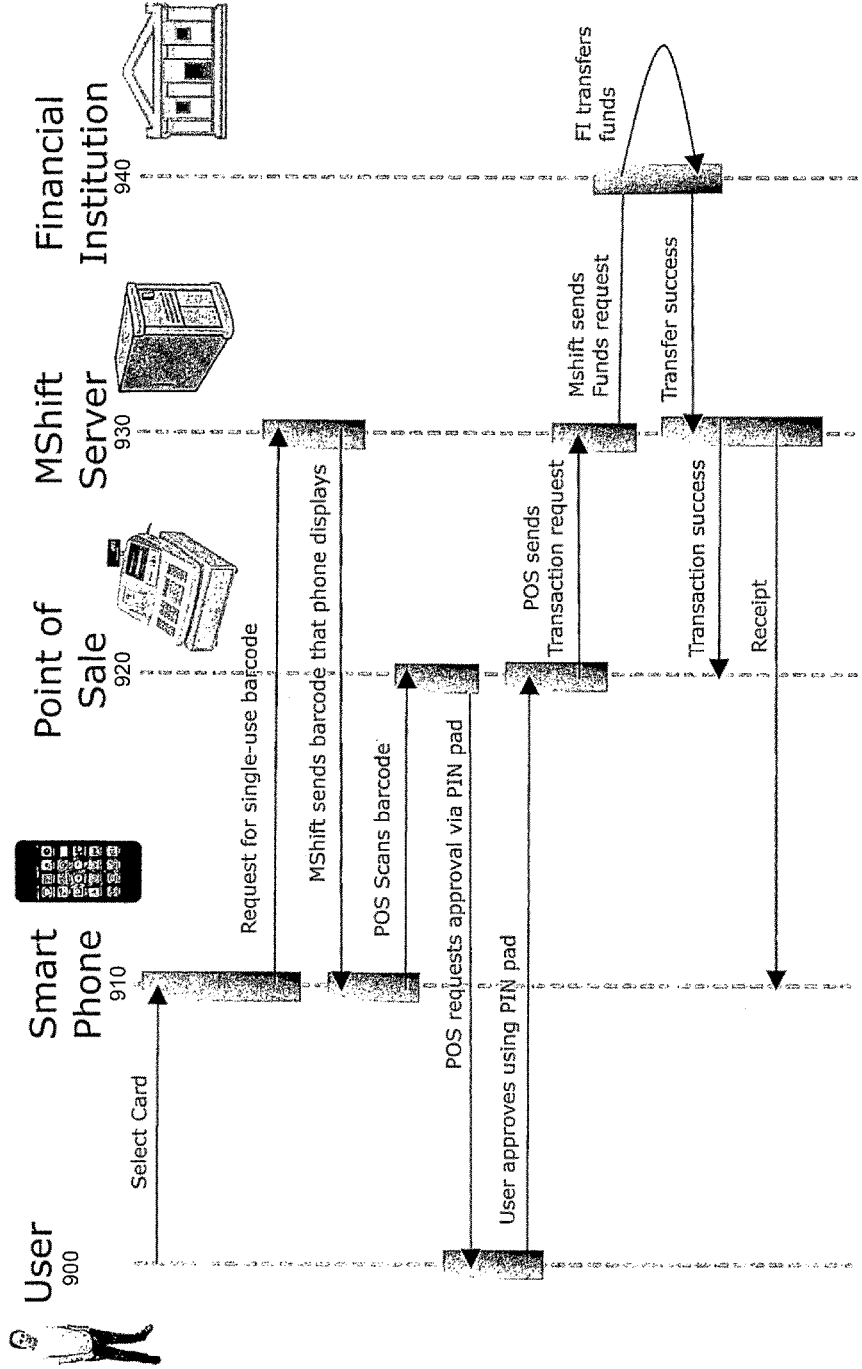
FIG. 9 shows a wallet flow for a mobile device identifier scenario in accordance with an embodiment of the invention.

FIG. 9 shows a wallet flow for a mobile device identifier scenario in accordance with an embodiment of the invention. One or more entities, such as a user 900 (e.g., consumer), mobile device 910 (e.g., smartphone), point of sale 920, intermediary server 930, and financial institution 940 may be capable of interacting with one another.

A user may select a card. The card may be a prepaid card, such as an instant prepaid debit card (e.g., AnyWhereMobile Debit Card) or an instant prepaid credit card (e.g., AnyWhereMobile Credit Card). The card selection may be provided to a mobile device of the user.

Upon receiving the selection, the mobile device may request a single use identifier (e.g., barcode) from an intermediary server. The intermediary server may send the identifier to the mobile device. The mobile device may display or otherwise provide a detectable signal representative of the identifier. For example, the mobile device may have a display showing a visibly discernible barcode.

A point of sale (e.g., merchant site) may read the detectable signal representative of the identifier. For example, the point of sale may scan a barcode. In some instances, information about the transaction may be displayed at the point of sale. For example, a consumer or other user may be able to view the transaction information. The point of sale may request approval from the user. In one example, the request for approval may be made via a pin pad. The user may review the transaction information and approve the transaction via the pin pad. Alternatively, any other user interface may be used to receive user approval. The user may or may not be present at the merchant site when approving the transaction. The user may manually enter the user's approval at the merchant site. Alternatively, the user may be remote to the merchant site but may receive transaction information (e.g., on a user device such as the user's smartphone), and may approve the transaction (e.g., via the user device).

The point of sale may send a transaction request to an intermediary server. The intermediary server may send a funds request to a financial institution. The financial institution may transfer the funds. In some instances, the financial institution may perform one or more assessment of whether the funds may be transferred prior to transferring the funds. For example, the financial institution may check that the user has sufficient funds in the user's account. If the transfer is a success, indication that the transfer was a success may be provided to the intermediary server. The intermediary server may inform the point of sale that the transaction was a success. The intermediary server may also provide a receipt for the transaction to the user, which may be accessible via a device of the user.

Figure 10:
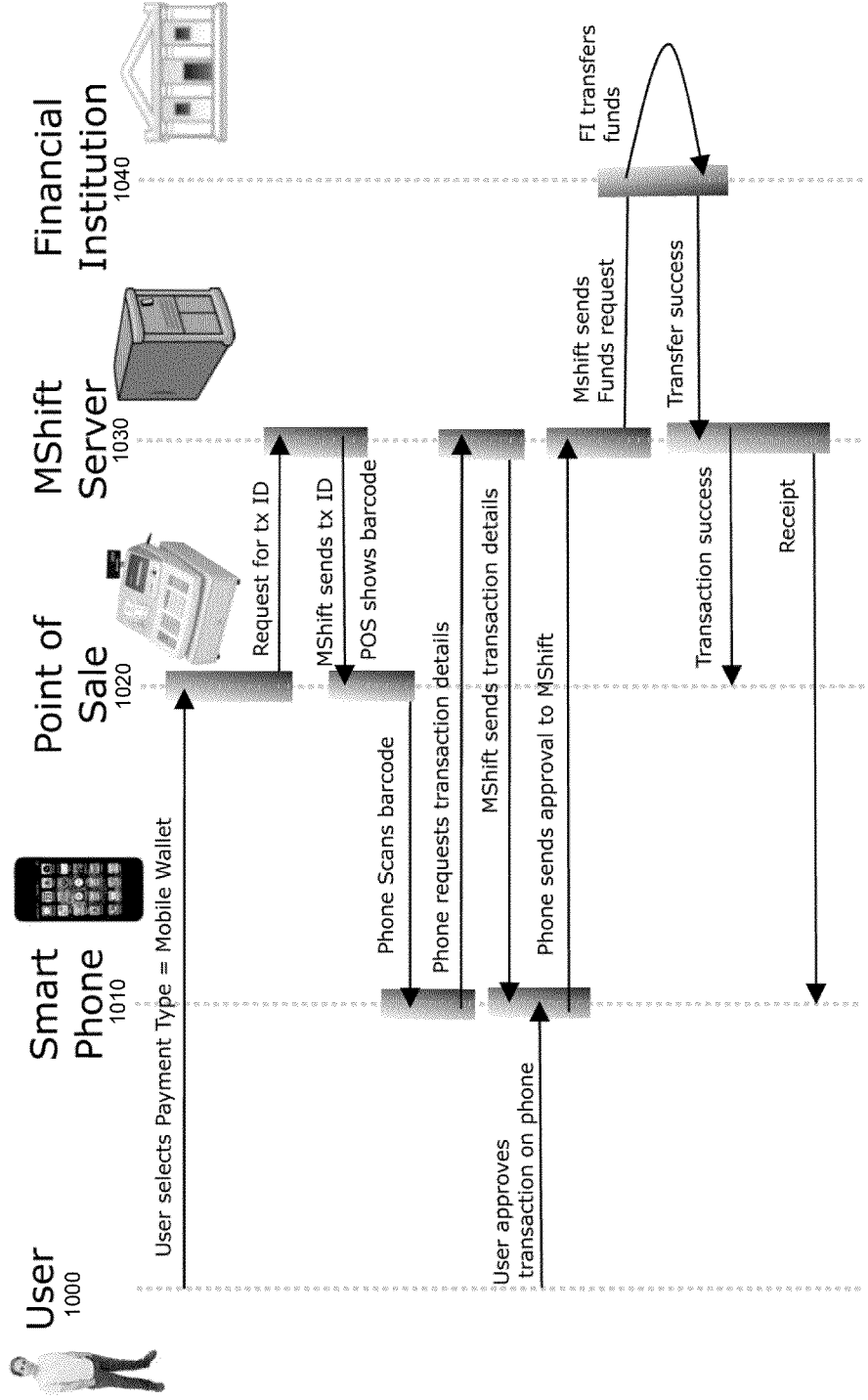
FIG. 10 shows a wallet flow for a point of sale identifier scenario.

FIG. 10 shows a wallet flow for a point of sale identifier scenario. One or more entities, such as a user 1000 (e.g., consumer), mobile device 1010 (e.g., smartphone), point of sale 1020, intermediary server 1030, and financial institution 1040 may be capable of interacting with one another.

A user may select a payment type. The payment type may be selected via or from a mobile wallet. The payment type selection may be provided at or to a point of sale. A point of sale device may receive the payment type selection from the user. The user may enter the payment type selection directly into a point of sale device, or via a mobile device of the user.

Upon receiving the selection, the point of sale may request an identifier (e.g., barcode) from an intermediary server. The identifier may be a unique transaction identifier. The intermediary server may send the identifier to the point of sale. A device at the point of sale may display or otherwise provide a detectable signal representative of the identifier. For example, the point of sale device may have a display showing a visibly discernible barcode.

A user device (e.g., mobile device such as smartphone) may read the detectable signal representative of the identifier. For example, a mobile device may scan or capture an image of a barcode. The mobile device may request transaction details from the intermediary server. The intermediary server may provide transaction details to the mobile device. In some instances, information about the transaction may be displayed at the mobile device or point of sale. For example, a consumer or other user may be able to view the transaction information. Approval may be requested from the user. In one example, the request for approval may be made via the user's mobile device. The user may review the transaction information and approve the transaction via the mobile device. Alternatively, any other user interface may be used to receive user approval. The user may or may not be present at the merchant site when approving the transaction. The user may manually enter the user's approval at the merchant site. Alternatively, the user may be remote to the merchant site but may receive transaction information (e.g., on a user device such as the user's smartphone), and may approve the transaction (e.g., via the user device).

The mobile device may send notice of approval to an intermediary server. The notice of approval may initiate a transaction request at the intermediary server. The intermediary server may send a funds request to a financial institution. The financial institution may transfer the funds. In some instances, the financial institution may perform one or more assessment of whether the funds may be transferred prior to transferring the funds. For example, the financial institution may check that the user has sufficient funds in the user's account. If the transfer is a success, indication that the transfer was a success may be provided to the intermediary server. The intermediary server may inform the point of sale that the transaction was a success. The intermediary server may also provide a receipt for the transaction to the user, which may be accessible via a device of the user.

An instant pre-paid card, such as a (e.g., AnyWhereMobile) debit and/or credit card can be integrated into individual merchant applications. The merchant may have the integration code in their application and a consumer may bind their mobile banking account to the merchant's application. The binding process can be initiated from either the merchant's application or from the mobile banking application. Such binding and/or registration may occur prior to one or more transactions as described elsewhere herein. Any of the embodiments described herein may be used in combination with the processes for integrating individual merchant applications.

Figure 11:
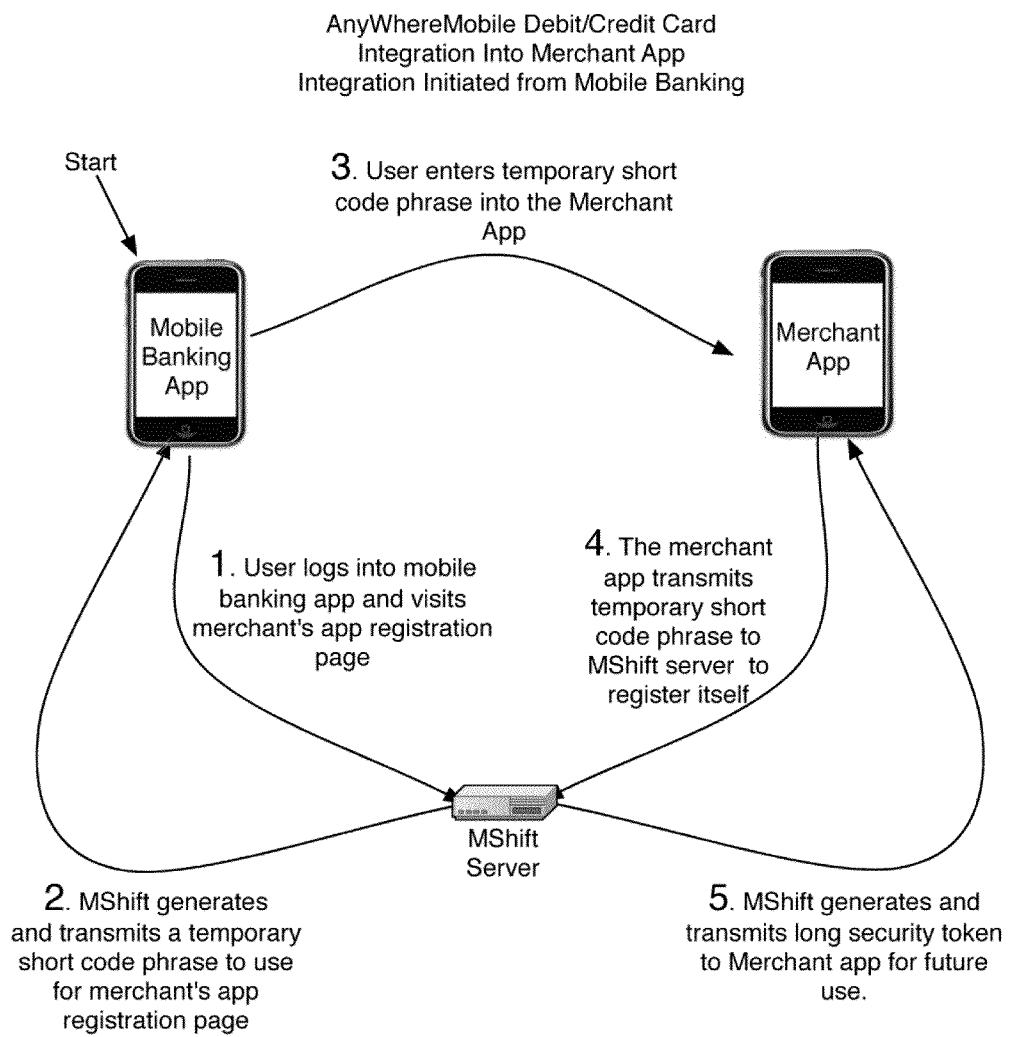
FIG. 11 shows a process for integration into a merchant application that is initiated by mobile banking.

FIG. 11 shows a process for integration into a merchant application that is initiated by mobile banking application. A user of the (e.g., AnyWhereMobile) debit and/or credit card may initiate the integration from within the mobile banking application. The user may log into their mobile banking application. The user may have an account with the bank that is accessible via the mobile banking application. The user may visit a portion of the banking application that may permit the user register the merchant application with their mobile wallet. In some embodiments, the user may register the merchant application by visiting the mobile application on their mobile device, or by visiting a web site for their bank on a separate device. The mobile application and/or web site may access the same memory or pool of information.

An intermediary party (e.g., MShift) may generate an authentication code. In some embodiments, the intermediary party server may generate the authentication code, which may include a temporary short code phrase and/or a long security token. These values may be registered with the user's mobile banking identification (e.g., user ID) in a data store. The data storage may be accessed by the intermediary server. In some instances, the data storage may be on the intermediary server and/or operated by the intermediary entity.

The authentication code (which may include the temporary short code phrase) may be transmitted to the user in the mobile banking application. The user may launch a merchant's application. The user may enter a mobile wallet setup within the merchant's application. The user may provide the authentication code (e.g., enter the temporary short code phrase) in the mobile wallet setup. In other embodiments, the user may provide the authentication code in any manner to the merchant application. In some embodiments, the merchant application may or may not already have some form of pre-registration or compatibility with the intermediary.

The merchant application may transmit the temporary short code phrase to the intermediary server. The intermediary server may respond with another portion of the authentication code (e.g., long security token). The merchant application may store the long security token for later use. The long security token or other form of authentication code may be used with future requests to intermediary servers from the user's mobile device as the identifier for the user.

The identifier may be used in connection with embodiments for transactions as described elsewhere herein. For example, when a barcode or other identifier is scanned by the point of sale (e.g., FIG. 6), a long security token may be submitted with the scanned barcode data to the intermediary by the merchant application. When the barcode or other identifier is presented by the merchant's application on a mobile device of the user (e.g., consumer's smartphone, such as shown in FIG. 7), the long security token may be transmitted to the intermediary with a user identified PIN (or other identifier) during the request for the barcode or other identifier.

Figure 12:
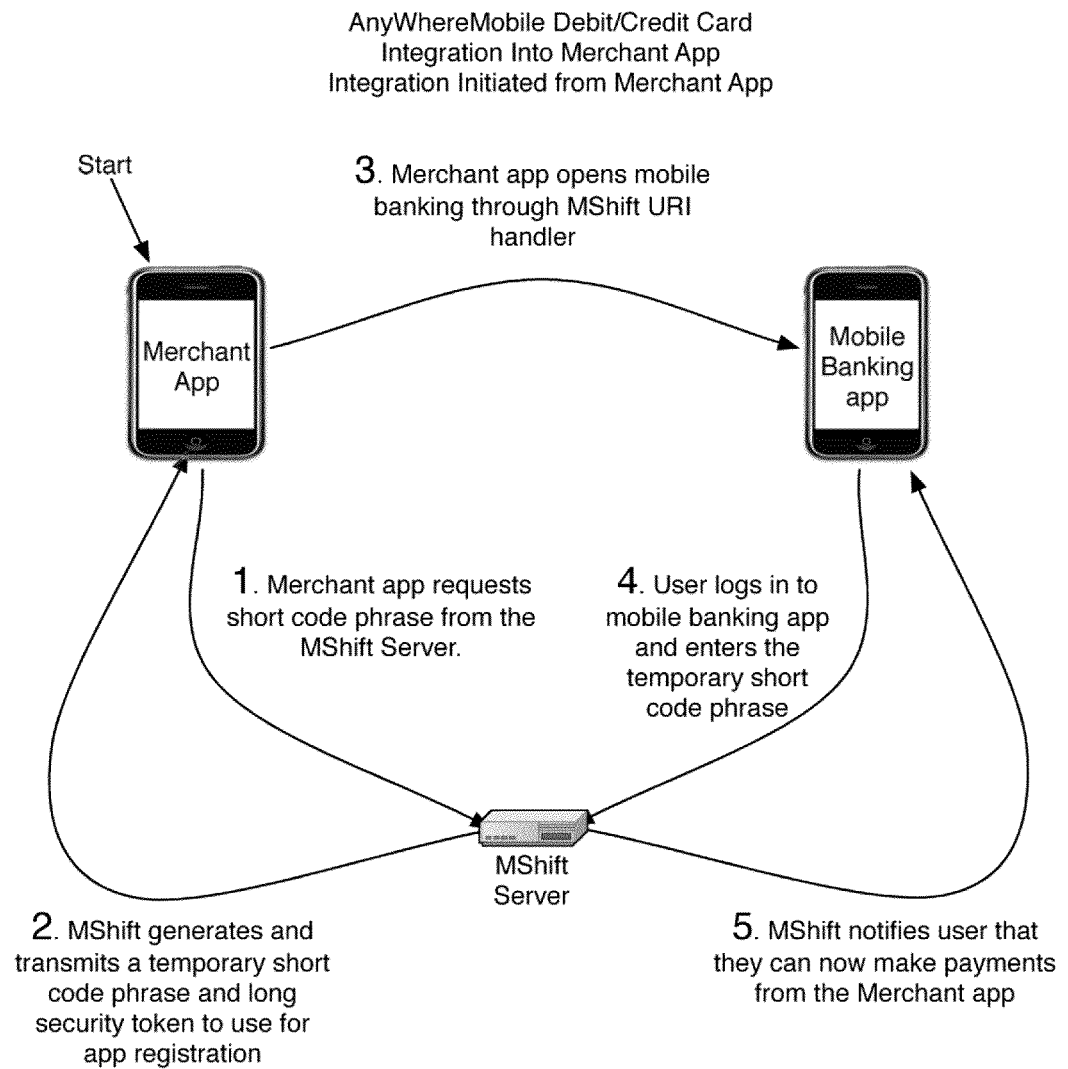
FIG. 12 shows a process for integration into a merchant application that is initiated by the merchant application.

FIG. 12 shows a process for integration into a merchant application that is initiated by the merchant application. A user of the (e.g., AnyWhereMobile) debit and/or credit card may initiate the integration from within the merchant application. The user may log into a merchant application. The user may or may not have an account with the merchant that is accessible via the merchant application. The user may visit a portion of the merchant application, such as their mobile wallet setup page. In some embodiments, the user may visiting a mobile merchant application on their mobile device, or by visiting a web site for the merchant on a separate device. The mobile application and/or web site may access the same memory or pool of information.

The merchant application may connect with intermediary (e.g., MShift) servers for registration. The intermediary party may generate an authentication code. In some embodiments, the intermediary party server(s) may generate the authentication code, which may include a temporary short code phrase and/or a long security token. These values may be registered in a data store. The data storage may be accessed by the intermediary server. In some instances, the data storage may be on the intermediary server and/or operated by the intermediary entity.

The authentication code or a portion thereof (which may include the temporary short code phrase) may be transmitted to the user in the merchant application. The merchant application may store the authentication code or a portion thereof (which may be a different portion of the authentication code, such as a long security token) for future use. The merchant application may launch a mobile banking application through the intermediary. For example, the mobile banking application may be launched via the intermediary URI handler. In some embodiments, the merchant application may or may not already have some form of pre-registration or compatibility with the intermediary. The user may have an account with the bank accessible via the mobile banking application.

The user may log into the mobile banking application, and may go into a merchant registration page within the mobile banking application. On the merchant registration page, the user may enter the authentication code or portion thereof (e.g., short code phrase). This may transmit the short code phrase back to the intermediary server. The intermediary server may register another portion of the authentication code (e.g., long security token) to the user's mobile wallet. The intermediary server may notify the user that they can make payments from the merchant application.

The long security token or other form of authentication code may be used with future requests to intermediary servers from the user's mobile device as the identifier for the user.

The identifier may be used in connection with embodiments for transactions as described elsewhere herein. For example, when a barcode or other identifier is scanned by the point of sale (e.g., FIG. 6), a long security token may be submitted with the scanned barcode data to the intermediary by the merchant application. When the barcode or other identifier is presented by the merchant's application on a mobile device of the user (e.g., consumer's smartphone, such as shown in FIG. 7), the long security token may be transmitted to the intermediary with a user identified PIN (or other identifier) during the request for the barcode or other identifier.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of purchasing or using an instant prepaid card for mobile payments comprising:

displaying an offer for the instant prepaid card on a device of an account holder at a financial institution or displaying an offer for the instant prepaid card at a point of sale to the account holder at a financial institution, wherein the instant prepaid card is redeemable with one or more merchants;

accepting a command to purchase the instant prepaid card, from the account holder;

determining, with aid of a processor, whether the account holder has sufficient funds or line of credit in the account holder's account at the financial institution for the purchase of the instant prepaid card;

initiating an ON-US transfer for the cost of the purchased instant prepaid card from the account holder's account to a holding account at the same financial institution without incurring a purchase fee if the account holder has sufficient funds or line of credit, wherein the ON-US transfer amount that is received at the holding account at the same financial institution equals the cost of the purchased instant prepaid card to the account holder, and wherein the holding account at the same financial institution belongs to an intermediary entity that (1) has holding accounts at multiple financial institutions offering instant prepaid cards to permit ON-US transfers for purchase of the instant prepaid cards, and (2) communicates with the one or more merchants; and generating and presenting the purchased instant prepaid card for redemption by a user at the point of sale, wherein the instant prepaid card is prepared for redemption within seconds of accepting the command to purchase the instant prepaid card and said determining whether the account holder has sufficient funds or line of credit and said initiating the ON-US transfer for the cost of the purchased instant prepaid card occurs after accepting the command to purchase the instant prepaid card and before generating and presenting the purchased instant prepaid card for redemption.

2. The method of claim 1 further comprising:
recording the value of the purchased instant prepaid card into a database;
reading and redeeming the value displayed by the instant prepaid card at the point of sale; and
updating the database to reflect the change in the underlying value held on the instant prepaid card upon transactions.

3. The method of claim 1 wherein the account holder's account is one or more of the following: demand deposit account, line of credit account, or loan account.

4. The method of claim 1 wherein the offer is displayed while the account holder is accessing the account holder's information at the financial institution through a mobile application.

5. The method of claim 1 further comprising initiating a transfer of funds from the holding account to a merchant account associated with a merchant who will redeem the instant prepaid card.

6. The method of claim 5 wherein the funds are transferred from the holding account to the merchant account through one or more settlement bank (clearing) accounts using one or more of the following: ON-US or Automated Clearing House (ACH) processes.

7. The method of claim 6 wherein the funds are transferred directly from the holding account to the merchant account using one or more of the following: ON-US or Automated Clearing House (ACH) processes.

8. The method of claim 1 wherein the value of the instant prepaid card is reloadable.

9. The method of claim 1 in which the presentment of the value of the instant prepaid card is done via visual presentment of a 1D or 2D barcode on the mobile device for redemption of value at the point of sale.

10. The method of claim 1 in which the presentment of the value of a transaction is done via visual presentment of a 1D or 2D barcode on a point of sale device and read by the mobile device for redemption of value at the point of sale.

11. The method of claim 1 in which the presentment of the value of the instant prepaid card is done via visual presentment of an alphanumeric code on the mobile device and entered manually at the point of sale for redemption of value at the point of sale.

12. The method of claim 1 in which the presentment of the value of the instant prepaid card is conveyed through sending the data via an electronic channel to communicate to a NFC or other electronic data reader for redemption of value at the point of sale.

13. The method of claim 1 wherein the initial user can generate and send an instant prepaid card to another individual.

14. The method of claim 1 wherein a merchant, the financial institution, or the intermediary can generate loyalty rewards and/or targeted offers to users based upon the transaction history and data generated by the invention.

15. The method of claim 3 wherein the instant prepaid card is used, and wherein the funds are transferred from the account holder's demand deposit account at the financial institution to merchant's account via one or more of the following: ON-US transfer or ACH, with or without clearing or aggregating account in a settlement bank.

16. The method of claim 3 wherein the instant prepaid card is used; wherein the funds are transferred from the account holder's line of credit account or loan account at the financial institution to merchant's account via one or more of the following: ON-US transfer or ACH, with or without clearing or aggregating account in a settlement bank.

17. The method of claim 15 wherein the transfer of the funds is initiated at the merchant's point of sale and wherein the value of the prepaid card generated is equivalent to the value of the transaction.

18. The method of claim 16 wherein the transfer of the funds is initiated at the merchant's point of sale and wherein the value of the instant prepaid card generated is equivalent to the value of the transaction.

19. The method or claim 15 wherein the transfer of funds occurs in an online environment, whether at the retailer's website or mobile apps.

20. The method or claim 16 wherein the transfer of funds occurs in an online environment, whether at the retailer's website or mobile apps.

21. The method of claim 5 wherein the merchant receives an authentication code that is used for future transactions between the merchant and the financial institution.

22. The method of claim 21 further comprising generating a temporary short code phrase and a long security token; providing the temporary short code phrase to the account holder.

23. The method of claim 3 wherein funds in the account holder's Demand Deposit Account or Line of Credit or Loan Account are transferred directly to a settlement bank (clearing) accounts via one or more of the following: ON-US or Automated Clearing House (ACH) processes, without the use of a holding account at the same financial institution.

24. The method of claim 5 wherein the account holder receives one or more of the following from the merchant: goods, services or cash.

* * * * *